United States Patent [19]
Wakelam

[11] Patent Number: 5,303,470
[45] Date of Patent: Apr. 19, 1994

[54] MACADAMIA NUT OPENING MACHINE

[76] Inventor: Henry G. Wakelam, P.D.C. Waipapa 0470, Kerikeri, New Zealand

[21] Appl. No.: 908,334

[22] Filed: Jul. 6, 1992

[30] Foreign Application Priority Data

Aug. 9, 1991 [NZ] New Zealand ............... 239348

[51] Int. Cl.⁵ .............................. A47J 43/26
[52] U.S. Cl. ................................ 30/120.2; 99/574
[58] Field of Search ............. 30/120.1, 120.2, 120.3, 30/120.4, 120.5; 99/594, 581, 576, 574; 90/574, 594

[56] References Cited

U.S. PATENT DOCUMENTS 4,307,660 12/1981 Clavel ............................. 99/574
5,070,617 12/1991 Frederiksen et al. ......... 30/120.2

Primary Examiner—Richard K. Seidel
Assistant Examiner—Paul M. Heurana

[57] ABSTRACT

Machine for opening shell fruit comprising two counter rotating plates 12 and 13 and having recesses in the peripheries incorporating cutting means 23, the axes of the plates 12 and 13 being parallel and alongside each other so as to allow the cutting means 23 to come together in phase and in so doing vary the shape and size of the space defined by the cutting means.

1 Claim, 3 Drawing Sheets

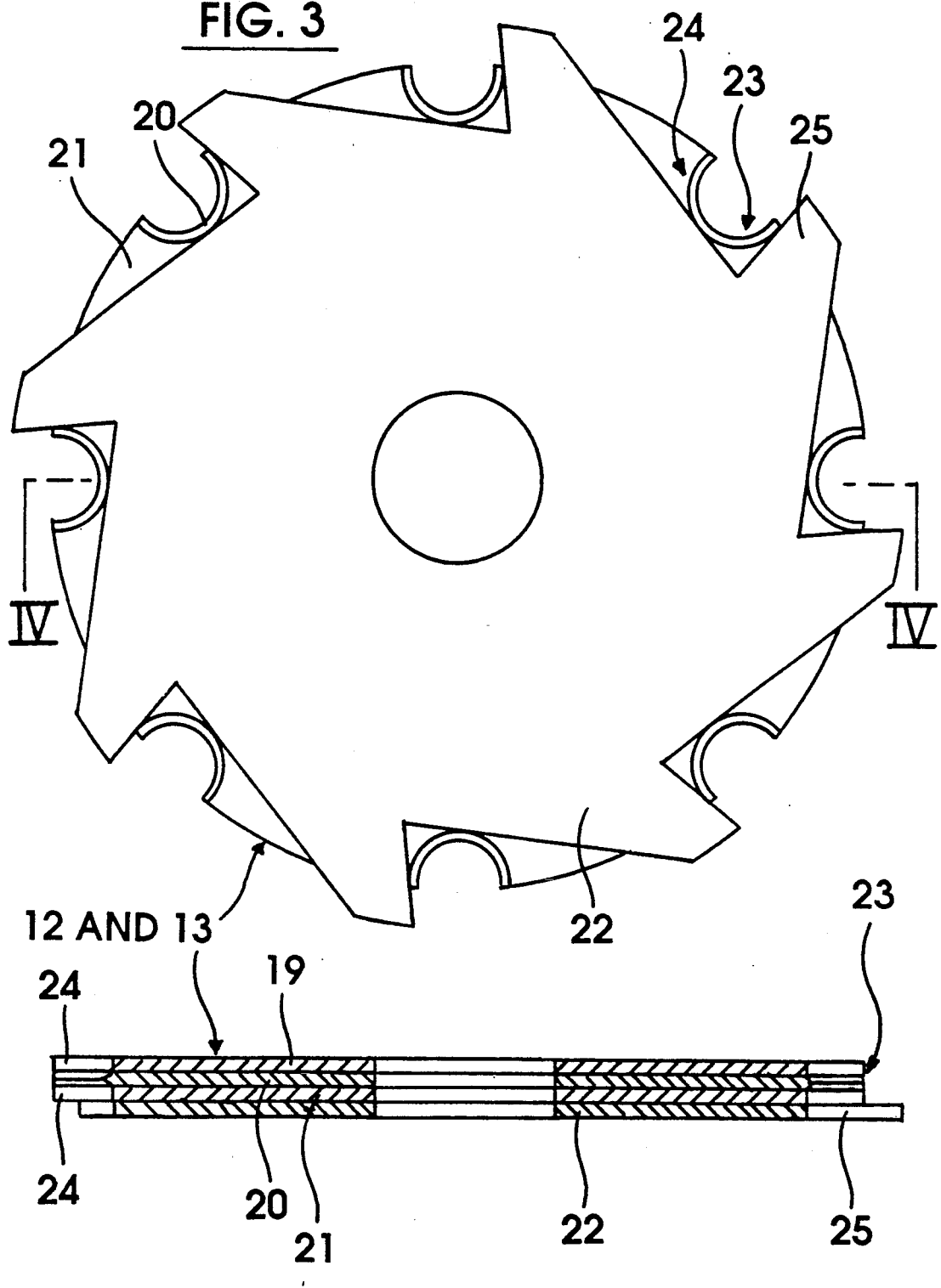

MACADAMIA NUT OPENING MACHINE

This invention relates to improvements in devices for opening of macadamia nuts and other approximately spherical nuts.

For all processors of macadamia nuts the proportion of whole kernels to damaged kernels delivered by macadamia nut opening machines is not high enough.

There have been many proposals to open macadamia nuts but these have all used crushing means, or straight cutters or curved cutters that reciprocate, have a scissor motion, or rotate singly, or in pairs with the cutting edge in line with the axis. These proposals have the disadvantage that the macadamia nut has not had correctly shaped cutters applied to it under controlled conditions, which also facilitate the cut nut being freed from the cutters.

SUMMARY OF THE INVENTION

The macadamia nut opening machine of this invention utilises the cutting technique of two specially configureated cutters that practically encircle a trapped nut and by the application of pressure do cut and split the shell into two major pieces. The device constructed to incorporate this cutting mechanism is designed to operate on macadamia nuts in particular and with replacement of certain sized cutting discs can cut all sizes of macadamia nuts and other nuts of round configuration with hard shells. In the preferred embodiment of this invention the device comprises two synchronised counter rotating disc assemblies being adapted to cut through the shell of the nut by using cutting recesses in the peripheries, the recesses of one disc being in phase with the recesses of the other disc curing counter rotation of the discs the cutters of which are on the same plane and the discs being very close to each other. The nut enters the space between the cutters, said space decreases as the discs turn, the shell is cut and the opened nut falls as the space increases.

In one form of the invention the device comprises two similar metal discs of approximately 210 mm diameter on the same plane and the discs being approximately 3 mm apart, the left one rotating clockwise and the right one rotating anticlockwise at the same speed.

The peripheries are smooth except where semicircular recesses are provided to form conave cutting edges in the center of the thickness of the disc to cut the nut shell.

These recesses are in phase and coincide during the rotation in the region of 48 RPM of the discs, and are so designed and arranged as to accept a nut from its position adjacent to the two moving peripheries with which it has been in friction contact caused by the force of gravity.

There is a spring loaded centralising guide for the nut which ensures that the concave cutting surfaces in the recesses do cut the shell only of the nut into what ressembles two hollow hemispheres because the minimum approximately circular space defined by the concave cutting edges is larger than the kernel when the centres of both discs and the centres of the arcs which define the cutting edges of a pair of converged recesses are in line.

There is provision made for a column of whole nuts, so that one nut only is presented to a cutter and that the nut which is presented is held in place by the succeeding nuts in the column.

The device is fitted to two horizontal parallel shafts. The discs can be changed to suit different nut sizes. The distance between the shafts is adjustable.

In another from of the invention, a disc with the cutting recesses may have a supporting disc of equal diameter in intimate concentric contact on each of its plane surfaces.

The peripheries of the support discs can have nearly semicircular recesses concentric to, and of greater radius than the cutting recesses so as to form shoulders which give support to the nut shell after the cutting edge in that area has penetrated into the nut. This support helps to avoid the cutting edge penetrating too far into the nut and spoiling the kernel, and also helps to ensure that both cutting edges penetrate the nutshell by guiding the nut to a central position.

In another form of the invention, the assembly of three discs can have a disc of slightly larger diameter fitted in intimate concentric contact on one side of the assembly of three. From the periphery of this fourth disc, steps can be cut so as to leave projections beyond the periphery of the assembly of three discs, adjacent to the trailing edge of the shoulders. This projection helps to guide the nut to a central position in relation to the cutters.

To assist with understanding the invention, reference will now be made to the accompanying drawings which show on example of the invention.

BRIEF DESCRIPTION OF THE DRAWINGS

FIG. 3 shows a face view of a disc assembly in one example of a macadamia nut opening machine according to this invention.

FIG. 4 shows a section view through a disc assembly in one example of a macadamia nut opening machine according to this invention.

Referring to FIGS. 3 and 4 it can be seen that the disc assembly used in the macadamia nut opening device according to this invention comprises of four laminations.

The laminations are preferably made of suitable metal.

The laminations are in the sequence : disc with shoulders 19. Disc with cutters 20. Disc with shoulders 21. Disc with projections 22.

When in operation, the complete disc assemblies are matched so that the projection of one disc assembly overlap the other disc assembly on the side without projections.

DESCRIPTION OF THE PREFERRED EMBODIMENT

Figure 1:
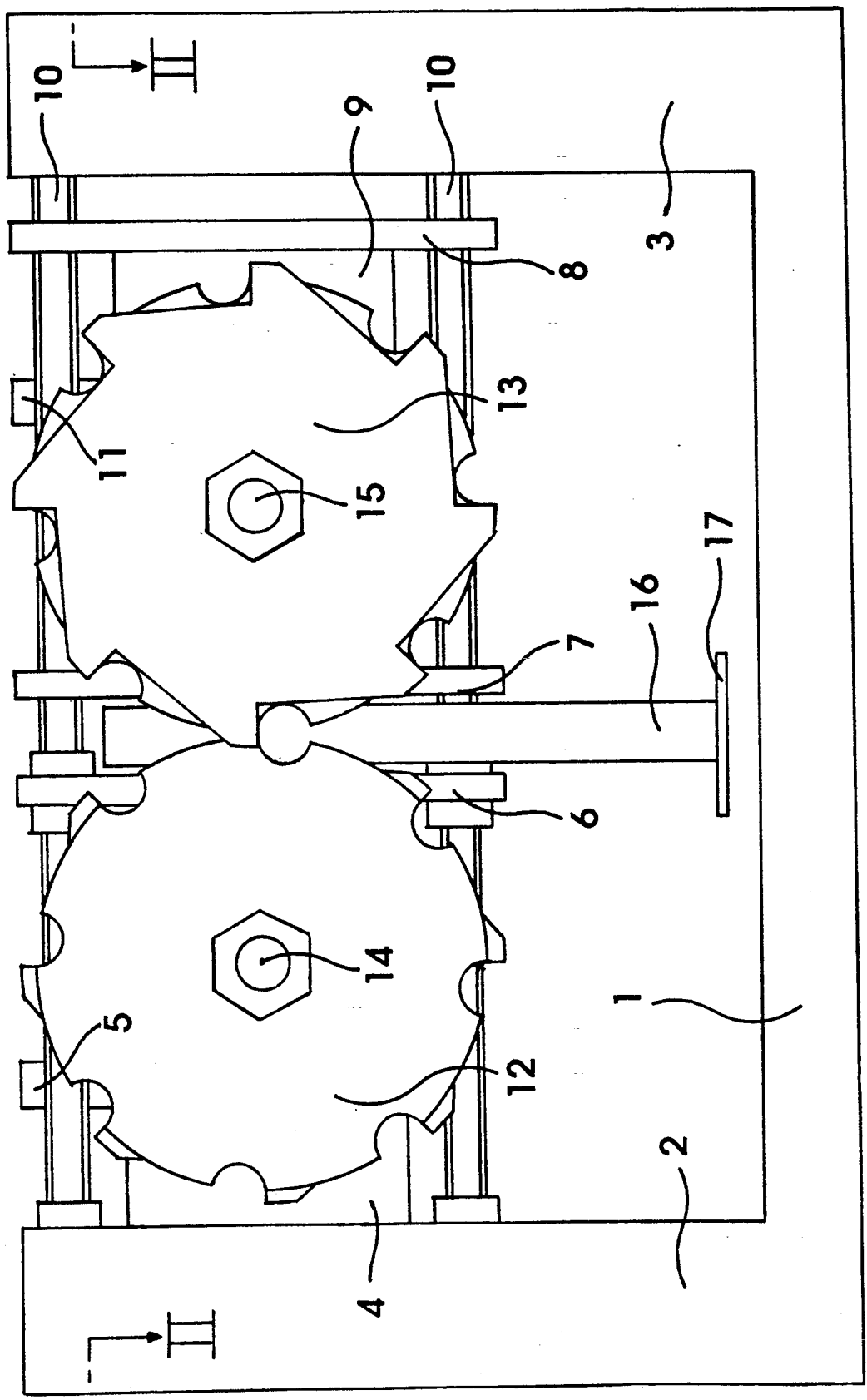
FIG. 1 shows a front view of the machine excluding feed.

Referring to FIG. 1 a horizontal channel iron base 1 has vertical uprights of the same material 2, 3 at each end. A worm reduction gearbox 4 such as a Radicon 280 type A is bolted to the inside of 2 close tot he top of it and with the input drive 5 uppermost and adjacent to 2.

A base plate 6 which extends above and below the case of the gearbox 4 is bolted to the vacant base surface of gearbox 4. Base plates 7 and 8 similar to that fitted to gearbox 4 are bolted to the identical gearbox 9. Four threaded stocks 10 are passed through holes which have been prepared in line through 2, 6, 7, 8, and 3. The threaded stock 10 where it passes through 2, 6, 3 is protected with bearing sleeves. The threaded stock 10 where it passes through 2,6 is fitted with collars to restrict longitudinal movement. Means such as sprockets and chain which are not illustrated are fitted to the protruding threaded stock 10 beyond the upright 2 for synchronising the manual rotation of the threaded stock 10 and in so doing allow adjustment of the distance separating 4 and 9. Means for synchronising the counter rotation of gearboxes 4 and 9 such as a timing belt and pulleys which are not illustrated is fitted between the input drive shafts 5 and 11. The input drive shaft of 9 has been fitted adjacent to 3. The input shaft 5 is also fitted with a drive pulley, which is not illustrated, for connection to a power source.

Discs 12 and 13 are securely fitted on to collars fitted to shafts 14 and 15 which are keyed into the hollow output shafts of 4 and 9.

The arm 16 which extends to well above the line joining the centres of 14,15 is pivoted about an axis 17 oriented in the same direction as 10. The arm 16 is held towards 12 and 13 by a spring not illustrated. The purpose of 16 is to restrict the horizontal movement of the nut and in so doing centralise it with respect to the cutters on discs 12 and 13.

Figure 2:
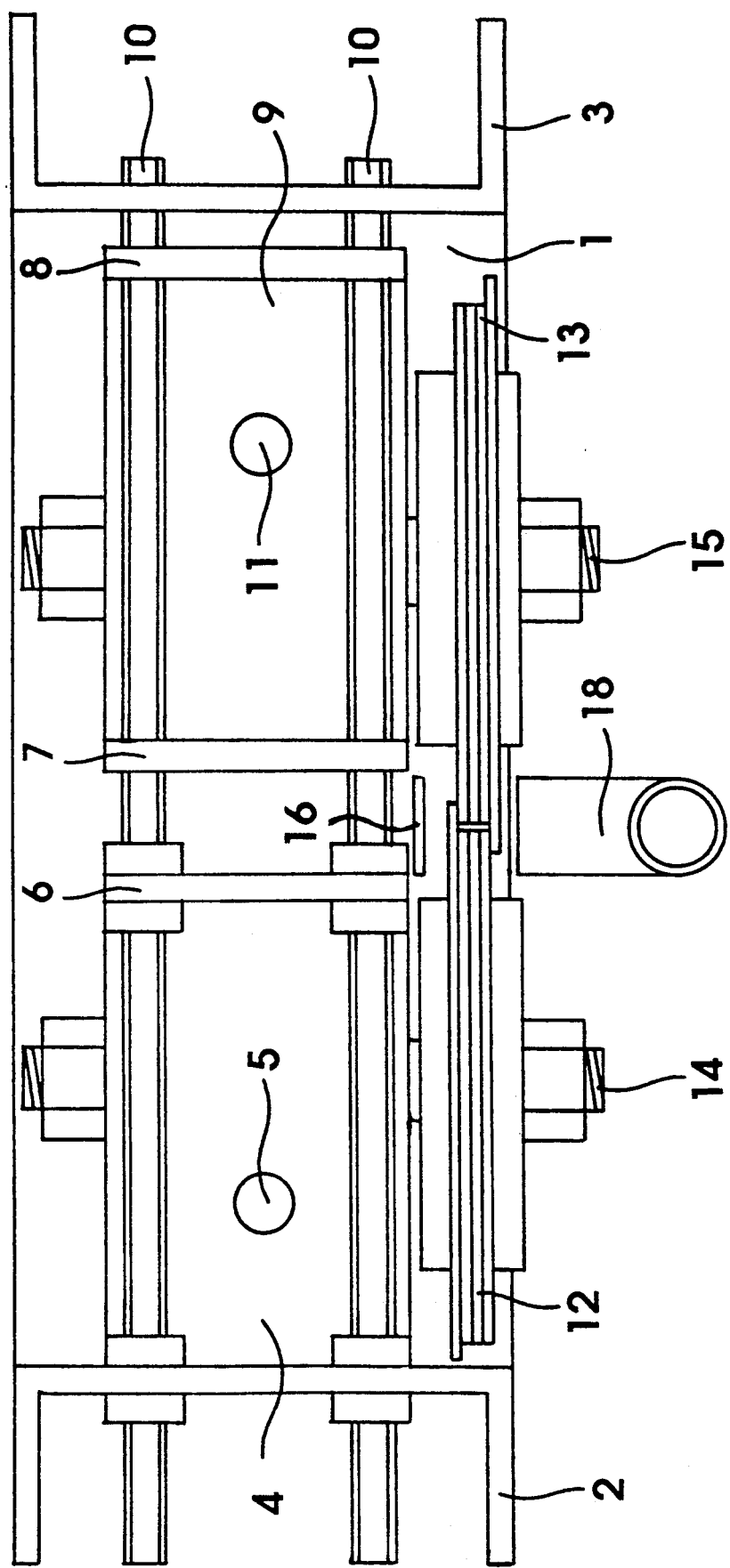
FIG. 2 shows a top view of the machine.

Refering to FIG. 2 facing and opposite to 16 at a height where a nut introduced by the curved feed pipe 18 can enter the upper space between the peripheries of discs 12, 13 without the nut having to drop to take up excessive clearance between the nut and 12,13 is the bottom opening of the curved feed pipe 18. In operation the feed pipe 18 maintains a column of nuts which maintain a pressure on 16 except when a nut is carried away by cutting recesses in 12 and 13.

Components, Feed pipe 18 and discs 12,13 will cover a variation in nut diameter of about 4 mm after which they must be changed for the next size range. Adjustment of 10 which alters the minimum space defined by the cutters on discs 12,13 depends on nut size, thickness of shell, dryness, nut variety etc. It is preferable that nuts are presized to 1 mm steps.

Refering to FIG. 3 and FIG. 4 discs 12 and 13 are made each from steel plates 19,20,21 in the form of a lamination. A fourth lamination of steel 22 is fitted to one side of the assembly of plates 12 and 13. Cutting recesses 23 are machined for the purpose of cutting the nut shell. Shoulders 24 are machined for the purpose of limiting penetration of the cutters 23 into the shell fruit. Projections 25 are machined so as to directed the shell fruit to a position where the leading edge of the cutters 23 will penetrate the shell fruit.

Refering to FIG. 3 the disc turns in the direction indicated by the arrow 26.

I claim:

1. A machine assembly for opening shell fruit comprising:
    a first substantially circular disc at the left side of the assembly rotating clockwise about a first axis int he form of a shaft and having in its periphery a plurality of curved recesses each incorporating a cutter and two shoulders and said disc having projections beyond and to one side of said periphery;
    a second substantially circular disc at the right side of the assembly rotating anticlockwise about a second axis in the form of a shaft and having in its periphery a plurality of curved recesses each incorporating a cutter and two shoulders and said disc having projections beyond and to one side of said periphery;
    said first and second circular discs being mounted at a distance from each other with the cutters on the same plane and rotating at the same speed in opposite direction so that the peripheral recesses are maintained in coinciding phase relationship which defines an approximately circular space at their coincidence said space being prior to the coincidence for receiving a single shell fruit being introduced in said space;
    said second axis being parallel and alongside the first axis whereby during said opposite rotational movement of both discs at essentially the same speed the overall form of the cross section of each cutting space changes as a result of relative motion between said paired recesses during rotation of said discs wherein a fruit introduced into said space is cut and thence released; and
    a fruit feed pipe for introducing one single fruit from the bottm of a column of fruit into the space between each individual pair of recesses during rotational movement of said discs at a position where said individual space has not yet reached its minimum overall size,
    said feed pipe having at its lower extremity an opening facing and adjacent to the plane of the cutters and said opening being substantially above the middle of the line joining the centres of the two discs;
    said lower opening of the feed pipe a spring loaded guide whereby the individual shell fruit at the bottom of the column of shell fruit is centralised by said guide in relation to said cutters;
    said curved recesses incorporating cutters having concave cutting edges in the form of an arc of a circle a cutting edge being at right angle to the axis of the disc;
    said counter rotating discs having concave shoulders at either side of the cutters a shoulder being in the form of an arc of a circle of greater radius than the radius of the cutting edge and being concentric to said cutting edge;
    said counter rotating discs having at one side of and beyond the periphery of said discs and integral to sais disc projections which have one limit defined by a tangent of said curved shoulders;
    said shafts having means to vary the distance between said shafts in order to modify the shape and size of the space defined by said coinciding recesses.

* * * * *